United States Patent Office 3,434,374
Patented Mar. 25, 1969

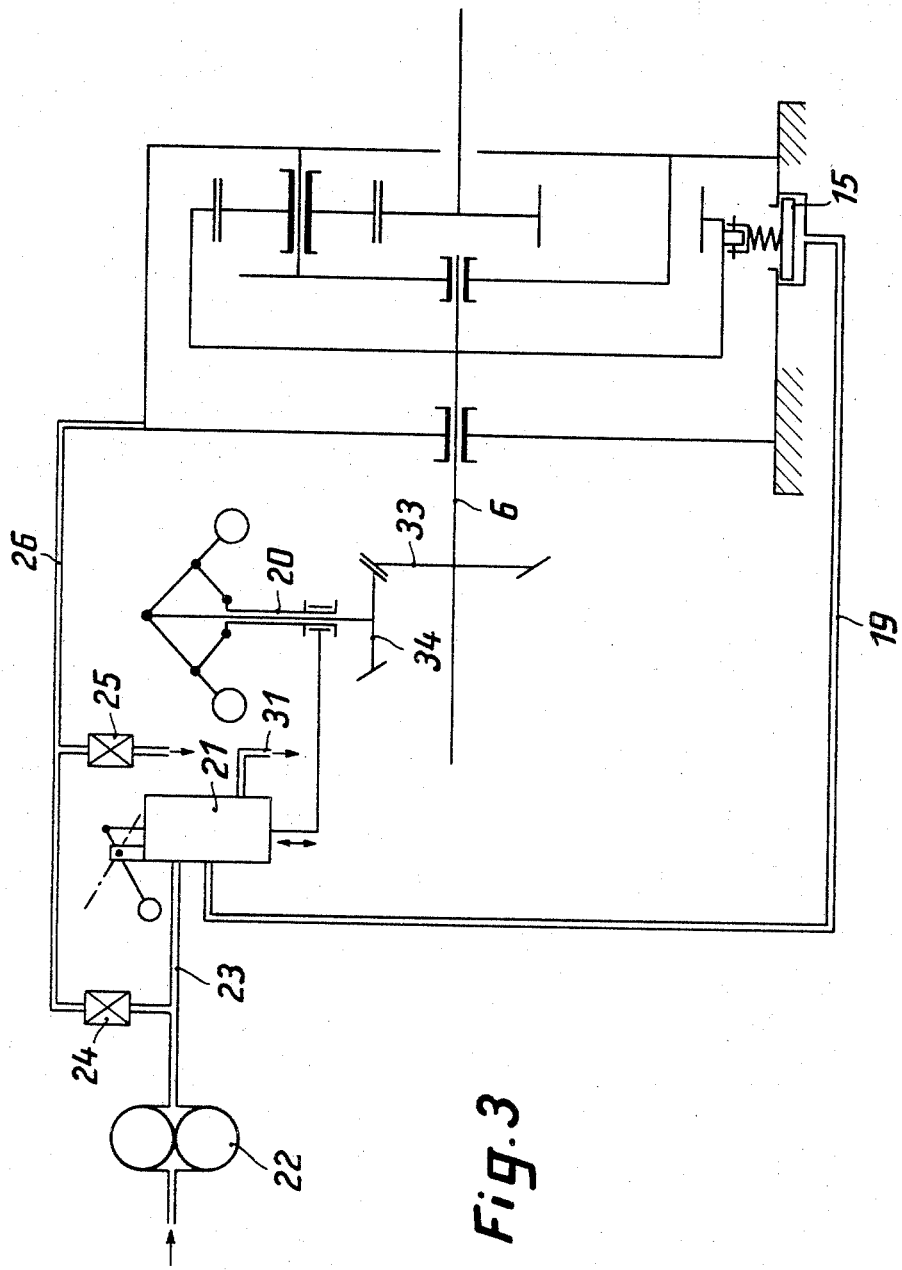

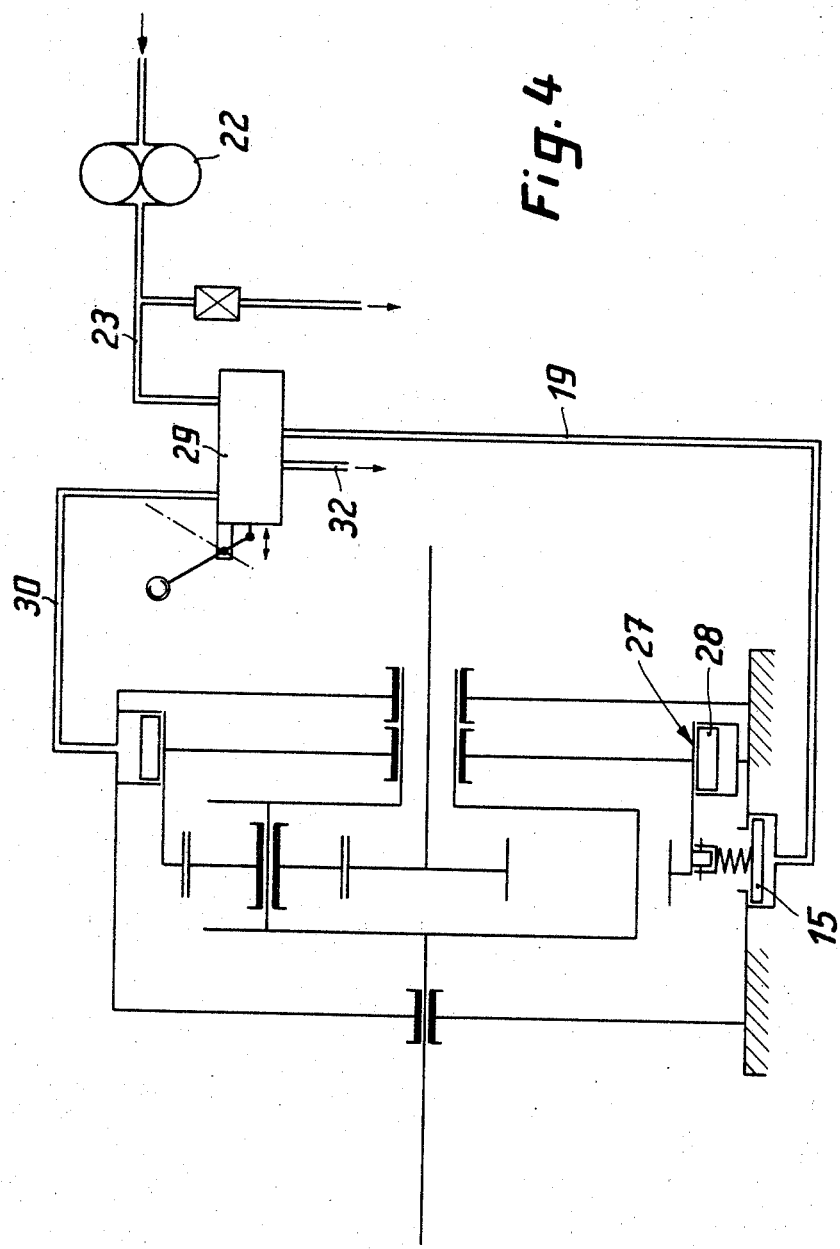

3,434,374
PLANETARY GEARING WITH A SUPPORTING DEVICE FOR THE OUTER CENTER GEAR
Hans A. Barwig and Gunther R. Heidrich, Munich, Germany, assignors to Alexander Wilhelm Stoeckicht, Munich-Solln, Germany
Filed Apr. 24, 1967, Ser. No. 633,145
Claims priority, application Germany, Apr. 27, 1966, Z 12,188
Int. Cl. F16h 1/28
U.S. Cl. 74—801    6 Claims

ABSTRACT OF THE DISCLOSURE

A rotating outer ring gear with internal toothing is arranged concentrically around an inner sun gear with external toothing. At least one planet gear is disposed between and meshing with said outer ring gear and said sun gear. The outer ring gear being unsupported is centered with respect to the axis of gearing by the radial tooth forces resulting from torque transmission. When the outer ring gear is rotating under no torque or only small torque transmitting conditions said forces are not sufficient to center the outer ring gear. In this case centering is effected by an adjustable supporting member. The supporting member is automatically lifted into supporting position when the tooth forces are not sufficient to center the outer ring gear but is automatically retracted when the tooth forces are sufficient to center the outer ring gear.

BACKGROUND OF THE INVENTION

Field of the invention

The invention relates to a planetary gearing with a device to support the outer ring gear which otherwise is not supported and centered by the meshing teeth of the gears in order to realize an automatic load balance, and is yieldably connected with a member receiving its torque. With this arrangement the outer ring gear may perform radial adjusting movements.

When a torque is transmitted, the radial adjustment or centering, respectively, of the outer ring gear is effected by the radial tooth forces resulting from the torque transmission. When starting such gearings and often also in partial-load conditions, the radial tooth forces occurring due to the small torques to be transmitted are not sufficient to lift the outer ring gear into a central position with respect to the axis of the gearing, or maintain it in this central position. In such operational conditions unfavourable tooth engagement relationships will occur between the toothings of the outer ring gear and the planet gears which may lead to an uneven running of the gears, considerable noise development and increased wear of the teeth. In this connection, especially in connection with larger planetary gearings, the weight of the outer ring gear including the members supported thereby which, with these larger gearings, is a considerable one, has an especially disadvantageous effect.

Description of the prior art

To avoid these unfavourable tooth engagement relationships which depend on the weight of the outer ring gear, it has already been proposed to support the outer ring gear by means of a supporting device either wholly or partially carrying the weight of said gear. In a known planetary gearing with a stationary outer ring gear a compression spring adapted to the center gear's weight and support the outer ring gear from below while being supported itself at the bottom of the housing, has already been provided for this purpose. This known supporting device, however, is not support for a sun gear which is connected with the reaction member receiving the torque thereof, for example with the gear housing, by means of a coupling or a brake. Attempts have been made already, it is true, to provide a support rotating ring gears using a roller yieldably supported, for example, by springs, which during rotation of the outer ring gear will roll along a guide path provided at the outer periphery of the outer ring gear. These attempts, however, did not lead to a satisfactory solution of the problem, because in this way during the entire operation the supporting roller rotates at a relatively high speed and high frictional losses are caused thereby which render the overall efficiency of the gearing considerably worse. Besides, considerable noise was caused in planetary gearings with such an outer ring gear support formed by a yieldably mounted supporting roller.

SUMMARY OF THE INVENTION

Starting from the known devices the object of the invention is to provide a planetary gearing with a device to support primarily a rotating outer ring gear which operates without the disadvantages inherent to the known supporting devices, which, however, may also be used in connection with stationary outer ring gears.

To solve this problem, the invention starts from a known planetary gearing with a device to support the axially unsupported outer ring gear yieldably coupled with a member receiving the torque thereof, said outer ring gear being elastically supported by at least one supporting member of a supporting device mounted on the gear case's lower region, the invention consisting in that the supporting member is adjustable between a position supporting the outer ring gear and a position retracted from the outer ring gear. In a preferred embodiment of the invention, the supporting member is operated hydraulically or pneumatically or mechanically, and may be connected with a fluid-operated piston by resilient means.

The supporting member of the supporting device according to the invention supports the radially unsupported outer ring gear which, for the purpose of realizing the automatic load balance, is yieldably coupled with the member receiving its torque, only during the starting phase and in partial-load conditions, however, releases said outer ring gear whenever the radial tooth forces due to the torque transmission suffice to center the outer ring gear. Since the supporting member of the supporting device is not engaging the outer ring gear, during the predominantly interesting operating conditions the influences impairing the efficiency of the gearing and enhancing the noise development are eliminated.

In a further and suitable embodiment of the invention, the supporting member may be actuated to take its position of releasing or supporting the outer ring gear, by means of an actuation device controlled by the speed of the outer ring gear In this case the actuating device keeps the supporting member in contact with the outer ring gear until a predetermined speed is reached, however, retracts said member from the outer ring gear if, in case of an increase in power proportional with an increase in speed, the radial forces in the toothing are increasing in such an extent that they are in a position by themselves to keep the ring gear in its centered position.

In further developing the invention, the hydraulic system supplying the cylinder of the piston with fluid to actuate the supporting member may be connected to the lubricating oil circuit or to the coupling shifting oil circuit, respectively, and the fluid pressure acting on the piston which actuates the supporting member, may be controlled as a function of the actuation of brake engaging at the outer ring gear.

In the following, the invention will be described in more detail by way of exemplified embodiments shown in the accompanying drawings without, however, being restricted to these embodiments.

BRIEF DESCRIPTION OF THE DRAWING

FIG. 3 shows a schematic view of the planetary gearing of FIG. 1 with speed responsive actuation of the supporting device, and FIG. 4 shows a schematic view of a planetary gearing, the outer ring gear of which is braked by means of a disengageable and engageable clutch and is supported by means of a supporting device operable in dependence upon the actuation of said clutch.

DESCRIPTION OF THE PREFERRED EMBODIMENTS

Figure 1:
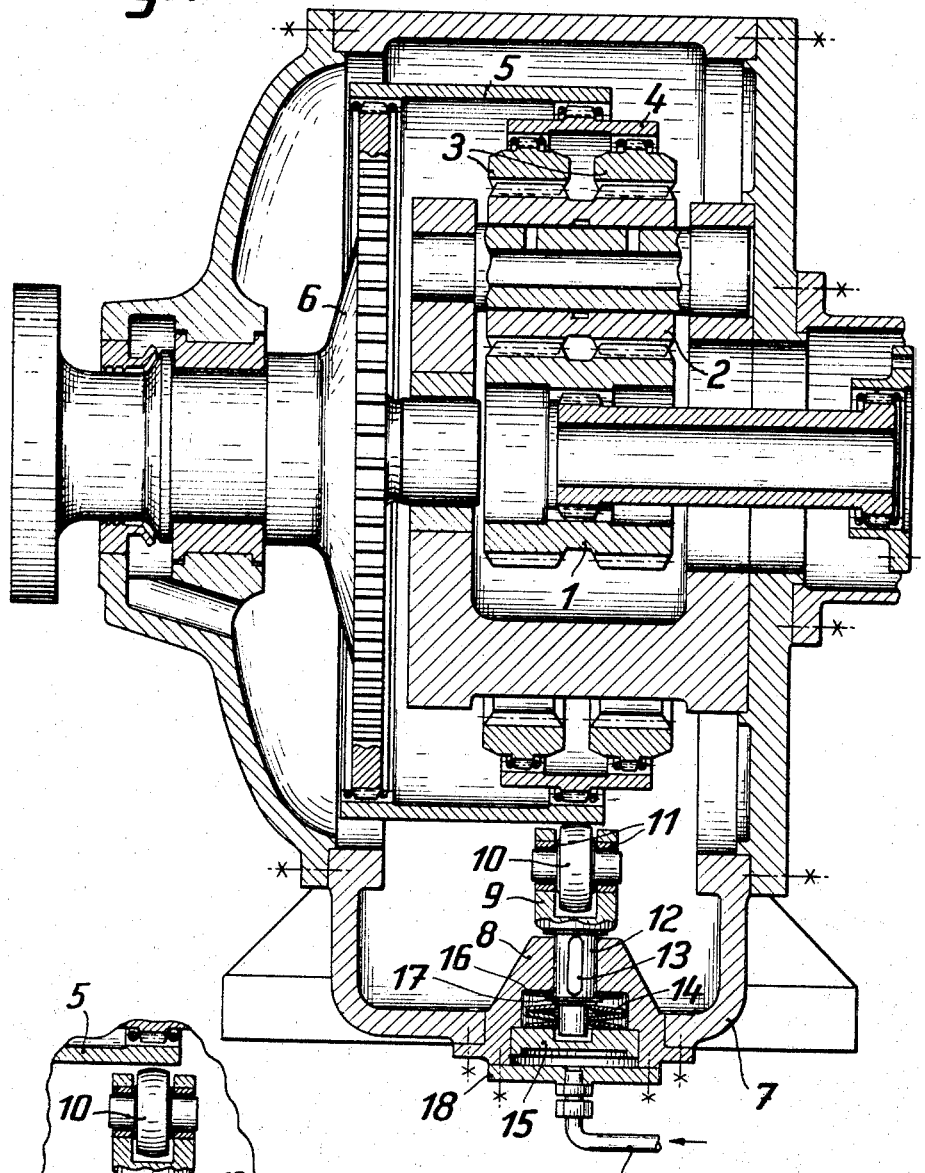
FIG. 1 shows a longitudinal sectional view of a planetary gearing with a rotating outer ring gear of bipartite design, supported by a hydraulically operated supporting device in accordance with the invention.

In the case of the planetary gearing shown in FIG. 1, the stationarily journaled planet gears 2 are in mesh with both the herringbone toothed inner sun gear 1 and the outer ring gear 3 of bipartite construction. The outer circumferences of the two outer ring gears 3 are toothed and linked with each other by means of a first gear coupling sleeve 4 which in turn is linked with the output shaft 6 by a second gear coupling sleeve 5 engaging outer teeth provided in the center of the first coupling sleeve and teeth provided on a disc of the output shaft 6.

The supporting device is arranged within a housing 8, which is flanged to the lower region of the gear case. The supporting device consists of a supporting member 12 vertically shiftably but nonrotatably supported in a bore of the housing 8 having a bifurcated head 9 at its upper end between the legs of which a supporting roller 10 is arranged freely rotatably supported in bearings 11. The tappet rod 12 is secured against rotation in its bore by a key 13. A cylinder bore adapted to be pressurized with fluid pressure is provided within the housing 8 axially aligned below the bore guiding the vertically displaceable tappet rod 12, a piston 15 being slideably arranged in said cylinder bore. Between the tappet rod 12 and the piston 15 Belleville springs 14 are arranged concentrically surrounding the lower end of the tappet rod engaging on the one hand a shoulder formed on the tappet rod and on the other hand the upper face of the piston. In addition, a return Belleville spring 16 engages a spring 17 carried by the tappet rod and the cylinder end wall effective to return the tappet rod to its retracted position releasing the outer ring gear. The outer side of the cylinder bore in the housing 8 is closed by a cover plate 18 having a pressure oil line 19 attached thereto opening into the cylinder space for supplying the cylinder with fluid pressure.

Figure 2:
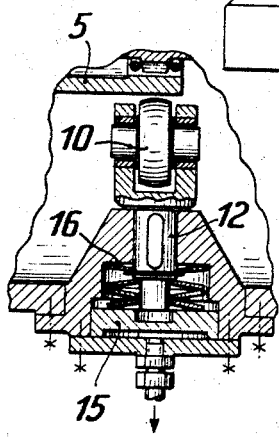
FIG. 2 shows a sectional view of the supporting device for the outer ring gear according to FIG. 1 with the supporting member retracted.

In FIG. 1, the piston 15 is actuated by the pressure medium and is disposed in its one limit position in which the supporting roller 10 journaled in the tappet rod 12 supports directly the gear coupling sleeve 5 and this in turn the gear coupling sleeve 4 coupling the bipartite outer ring gear members 3. In FIG. 2, the piston 15 is not exposed to any fluid pressure, and the supporting roller 10 supported by the tappet rod 12 is disposed in a retracted position thereby releasing the coupling sleeve 5 connected with the outer ring gear 3 by means of the coupling sleeve 4.

In the embodiment shown diagramatically in FIG. 3, the output shaft 6 is provided with a pair of bevel gears 33, 34 driving a centrifugal governor 20 acting on a control valve either directly or by means of suitable intermediate members not shown in more detail. The control valve 21 is arranged in a hydraulic system including a pump 22 and serves to control the pressure fluid supplying via a line 23 to the cylinder of the piston 15 which is resiliently engaging the tappet rod 12. For example, the pump 22 and the line 23 may constitute a part of the lubricant supply system of the gearing a line 26 including a pressure reducing valve 24 and downstream therefrom a pressure relief valve 25 is supplying the gearing with lubricating oil line 23 being a branch line connected upstream of the pressure reducing valve 24 to the line 26. The control valve 21 actuated by the centrifugal governor either connects line 19 to the line 23 or to a return line 31 in dependence on the speed of the outer ring gear thereby either advancing or retracting the tappet rod 12 with its supporting roller 10.

The planetary gearing shown diagrammatically in FIG. 4 comprises an outer ring gear which, although rotatable, may be held stationarily by a brake, and a rotating planet gear carrier. The outer ring gear is radially unsupported in the same manner as the outer ring gear shown in FIG. 1 and is coupled with the member receiving its torque, in this case brake disc 27. The brake disc 27 may be retained or released by the brake elements 28 in dependence upon the adjustment of the control valve 29 which controls the pressure fluid supply for actuating the brake elements 28 via the line 30. The control valve 29 is supplied with pressure fluid by the pump 22 via the line 23. The conduit 19 serving to supply and return pressure fluid via the control valve 29 to and from the cylinder in the same manner as shown in FIG. 3, so that the pressure fluid is supplied or returned in dependence on the adjustment of the control valve 29.

When during starting or partial-load operating conditions, the radial tooth forces acting on the outer ring gear are insufficient to center the outer ring gear supporting of the outer ring gear by the supporting device will be necessary, in order to compensate the weight of the ring gear and that of the gear coupling sleeves 4 and 5. FIG. 1 shows the supporting device in operation. In the case of the gearing shown in FIG. 3, the supporting of the outer ring gear is effected in that the centrifugal governor 20 driven at the speed of the outer ring gear via the bevel gears 33, 34 adjusts the control valve 21 in such a manner that the piston 15 is exposed to the fluid pressure via the line 19. The piston 15 due to this pressure will move upwardly to its limit stop and will transfer its adjusting power to the tappet rod 12 by compressing the Belleville springs 14 and the return Belleville spring 16. In this, the force exerted by the Belleville springs corresponds to the weight of the outer ring gear and the gear coupling sleeve to be compensated. If the torque increases the radial tooth forces acting on the outer ring gear also increase in proportion to the speed increase to such an extent that they are capable to center the outer ring gear or maintain such centering, respectively, whereupon the pressure fluid supply to the line 19 is interrupted, and line 19 is connected to return line 31, or 32 respectively. Due to the permanent return force exerted on the tappet rod 12 by the return spring 16, resetting of the piston 15 is effected, so that the support roller 10 is retracted from the coupling sleeve 5 and fully releases the outer ring gear. As in the above described manner the hydraulic line 19 is connected to an outlet first, for instance the drain line 31, the pressure medium displaced during the return movement of the piston 15 may flow out of the cylinder substantially without any resistance.

The planetary gearing shown in FIG. 4 is a change-over gearing in which a support of the outer ring gear will become necessary only whenever the outer ring gear linked with the brake disc 27 is rotating after releasing the brake. During this gear shift operation, there is no torque transmission taking place by the outer ring gear so that the radial tooth forces necessary for the centering action are not available. The control valve 29 is designed in such a manner that when the pressure fluid line 30 leading to the brake is interrupted, the pressure fluid line 19 is simultaneously supplied with pressure fluid and consequently the supporting device to support the outer ring gear is actuated. The return flow of the pressure fluid displaced by the brake is taking place through line 30, the control valve 29 and a drain line 32. As soon as the brake elements 28 are pressurized again with pressure fluid via line 30 thereby blocking the brake disc 27 and the outer ring gear, the line 19 leading to the cylinder of the supporting device is simultaneously connected to the drain line 32 by the control valve 29, so that the fluid supply to the supporting device is interrupted in the above described manner immediately the outer ring gear has been braked, and the pressure fluid displaced by the returning piston 15, may drain off.

It is also within the scope of the present invention to actuate the supporting device pneumatically and mechanically. Likewise, the control valve may be actuated manually or with the aid of an electromagnet or the like.

What we claim is:

1. A planetary gearing comprising, in combination, first and second coaxially aligned members rotatable about an axis, a toothed sun gear connected to one of said members for rotation therewith about said axis, an annular toothed ring gear mounted upon said other member for rotation therewith about said axis, said ring gear being in axial alignment with said sun gear, means yieldably connecting said ring gear to said associated other member permitting radial movement of said ring gear with respect to said axis, at least one toothed planet gear disposed between and meshing with said sun and ring gears, a radially movable ring gear support member movable between a retracted position and a supporting position adapted to selectively radially position and support said ring gear against gravitational forces, and operating means connected to said support member selectively moving said support member between said positions.

2. In a planetary gearing as in claim 1 wherein said ring gear includes an upper and a lower region, said support member selectively engaging said lower region of said ring gear.

3. In a planetary gearing as in claim 1 wherein said ring gear support member includes a radially movable rod, and a roller rotatably mounted on said rod for selectively engaging and supporting said ring gear.

4. In a planetary gearing as in claim 3 wherein said operating means includes a cylinder fixed with respect to said axis, a piston movably mounted in said cylinder, said rod being connected to said piston, a pressurized medium supply conduit communicating with said cylinder and valve means controlling pressurizing of said conduit.

5. In a planetary gearing as in claim 1 wherein said operating means includes speed sensing means connected to one of said rotatable members and operatively connected to said support member, said speed sensing means positioning said ring gear support member between said retracted and supporting positions in accord with the rotational velocity of the sensed rotating member.

6. In a planetary gearing as in claim 1, fluid operated brake means controlling rotation of said ring gear, a fluid motor connected to said ring gear support member for moving said support member between said retracted and supporting positions, said operating means including a fluid valve controlling the flow of pressurized fluid to said brake means and said motor wherein the position of said supporting member is related to the angular velocity of said ring gear.

References Cited

UNITED STATES PATENTS

| 2,868,040 | 1/1959 | Chamberlin | 74—801 |
| 3,011,365 | 12/1961 | Stoeckicht | 74—801 |
| 3,188,888 | 6/1965 | Zink et al. | 74—801 |
| 3,289,488 | 12/1966 | Breuer | 74—801 X |

ARTHUR T. McKEON, *Primary Examiner.*

U.S. Cl. X.R.

74—410